United States Patent [19]
Clark

[11] 3,841,107

[45] Oct. 15, 1974

[54] MAGNETIC REFRIGERATION

[75] Inventor: Arthur C. Clark, Adelphi, Md.

[73] Assignee: The United States of America as represented by the Secretary of the Navy, Washington, D.C.

[22] Filed: June 20, 1973

[21] Appl. No.: 371,917

[52] U.S. Cl. .......... 62/3, 165/96
[51] Int. Cl. .......... F25b 21/02
[58] Field of Search .......... 62/3; 165/96

[56] References Cited

UNITED STATES PATENTS

| | | | |
|---|---|---|---|
| 2,913,881 | 11/1959 | Garivin | 62/3 |
| 3,004,394 | 10/1961 | Fulton | 62/3 |
| 3,108,444 | 10/1963 | Kahn | 62/3 |
| 3,119,236 | 1/1964 | Lutes | 62/3 |
| 3,296,825 | 1/1967 | Kanzy | 62/514 |
| 3,343,009 | 9/1967 | Wagini | 310/4 |
| 3,393,526 | 7/1968 | Pearl | 62/3 |
| 3,643,734 | 2/1972 | Deschamps | 165/96 |

*Primary Examiner*—William J. Wye

[57] ABSTRACT

A magnetic refrigeration system includes thermal transfer means comprising a serial arrangement of magnetocaloric elements and a source of magnetic field. The serial arrangement comprises a material having a large, negative magnetocaloric effect which cools upon application of a magnetic field; a paramagnetic material in abutting relationship therewith which cools upon removal of a magnetic field; and end elements functioning as thermal switches. The magnetic field is caused to move along the serial arrangement, permitting heat to be transferred from a heat source to a heat sink. Cascading of the serial arrangements increases the refrigeration effect.

20 Claims, 9 Drawing Figures

| SEQUENCE | SOL. 26 | SOL. 28 | SOL. 30 | SOL. 32 |
|---|---|---|---|---|
| 0 | ON | ON | OFF | OFF |
| 1 | OFF | ON | OFF | OFF |
| 2 | OFF | OFF | ON | OFF |
| 3 | OFF | OFF | ON | ON |
| 4 | OFF | OFF | ON | OFF |
| 5 | OFF | ON | OFF | OFF |
| 6 | ON | ON | OFF | OFF |

MAGNETIC REFRIGERATION

BACKGROUND OF THE INVENTION

Refrigeration of infrared (IR) devices is widespread. Many IR devices can only operate when cooled to low temperatures. For example, some airborne IR mapping systems that detect the natural IR radiation from the ground use mercury-doped germanium detectors at 30°K. IR detection is only one area where cryogenic ambients are required. Parametric amplifiers as low noise components in microwave communication systems are widely used. Again, the performance of these components depend upon low temperatures. Laser cooling, cooling of superconducting transmission lines, and the use of miniature cryo-electronic elements for computer memories are areas which still remain relatively unexplored partly because of limitations in the present methods of cryogenic refrigeration.

Present methods of cryogenic cooling include mechanical pumps to achieve pressure differences wherein cooling is accomplished by the expansion of a gas and adiabatic demagnetization of a paramagnetic salt wherein cooling is obtained by removing a field generated by an external electromagnet. Miniature cryogenic refrigeration systems presently used suffer from frequent maintenance requirements and high failure rates. At temperatures in the region of 4° to 25°K, the cost of existing systems skyrocket. When the desired temperature is reduced from approximately 22° to 4°K, the cost of commercially available, closed-cycle refrigerators increase precipitously. Additionally, the 4°K units generally require large compressors which increase the weight of the system by more than 30 times and the required input power by more than 10 times. Thus, only certain applications are possible with the low temperature units.

Recently, it has been discovered that certain ferrimagnetic iron garnets possess a large, negative magnetolcaloric effect in the region of 4° to 25°K. Garnets with a negative coefficient cool under the application of a magnetic field. This is the opposite of conventional paramagnets which cool with a decrease of an external magnetic field. A magnetic refrigeration system which utilizes this unique characteristic of the garnet in conjunction with conventional paramagnets would possess advantages not available with current refrigeration systems.

SUMMARY OF THE INVENTION

It is therefore an object of the present invention to provide a new and improved magnetic refrigeration system.

Another object of the invention is to provide an improved magnetic refrigeration system that is truly reliable and low in cost.

Still another object of the invention is the provision of an improved magnetic refrigeration system requiring little or no maintenance containing few or no moving parts.

A further object of the invention is the provision of an improved magnetic refrigeration system that is compact, light in weight and has a low input power requirement.

Briefly, in accordance with one embodiment of the invention, these and other objects are attained in a magnetic refrigeration system including a heat source and a heat sink thermally connected by a serial arrangement of magnetocaloric elements having a large, negative magnetocaloric effect in abutting relationship with a paramagnetic material and end elements functioning as thermal switches. A magnetic field is caused to move from the material possessing the negative magnetocaloric effect, which cools in the presence of the field, to the paramagnetic material, which cools upon removal of the magnetic field. Cascading of the serial arrangements increases the thermal flow.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figures 1, 4:
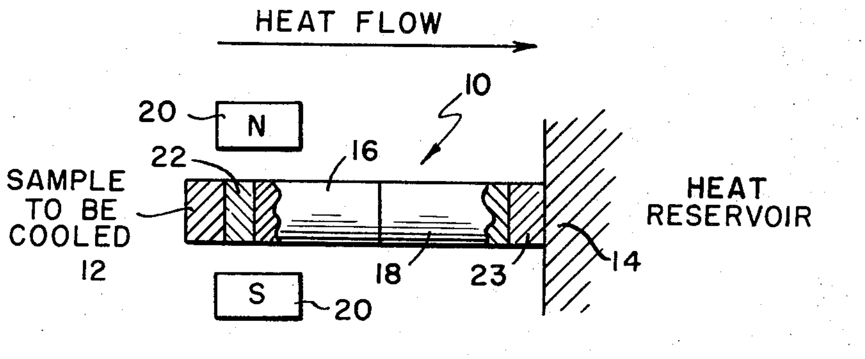
FIG. 1 is a schematic representation of one embodiment of the magnetic refrigeration system.
FIG. 4 illustrates the sequence of energizing the magnetizing solenoids in one method of operation of the invention.

Referring now to the drawings wherein like reference characters designate identical or corresponding parts throughout the several views and more particularly to FIG. 1 thereof, the magnetic refrigeration system 10 includes a heat source 12, which would normally be the material or apparatus to be cooled, a heat sink or reservoir 14 to which the heat is transferred, a serial arrangement of magnetocaloric heat transfer elements 16, 18 thermally coupling the heat source and heat sink, and a source of magnetic field 20. Heat transfer means 16 and 18 are in abutting contact with thermal switches 22, 23.

Heat transfer element 16 is of a material having a large, negative magnetocaloric coefficient which cools in the presence of a magnetic field. Examples of this type of material are the ferrimagnetic, rare-earth iron garnets, such as ytterbium iron garnet ($Yb_3Fe_5o_{12}$), ytterbium – yttrium iron garnet ($yb_{0.9}Y_{2.1}Fe_5o_{12}$) and gadolinium – yttrium iron garnet ($Gd_{0.6}Y_{2.4}Fe_5O_{12}$). In certain of these garnets, the absolute value of this effect is approximately 0.1°K/KOe and gadolinium -yttrium iron garnet ($Gd_{0.6}Y_{2.4}Fe_5O_{12}$). In certain of these garnets, the absolute value of this effect is approximately 0.1°K/KOe in the critical temperature region between 4°K and 20°K, which is indicative of the temperature reduction of the applied magnetic field under no load conditions.

Element 18, in direct, abutting contact with one end of element 16, may be of a magnetocaloric material which cools upon demagnetization, such as ytterbium aluminum garnet, (YbAlG), or gadolinium aluminum garnet, (GdAlG). Alternatively, element 18 may be any material which is a good heat conductor and nonresponsive to a magnetic field, as will be considered more fully hereinbelow.

Heat valves or switches 22, 23 are positioned between the heat source 12 and the free end of element 16 and between the free end of element 18 and the heat sink 14. Switches 22, 23 function to complete the thermal path between heat source 12, heat sink 14 and conducting elements 16, 18. They may be fabricated of any suitable material or means which achieves this function. In a cryogenic environment, heat switches of a superconducting material are ideal since such materials exhibit changes in thermal conductivity in the presence of a magnetic field.

Figure 2A:
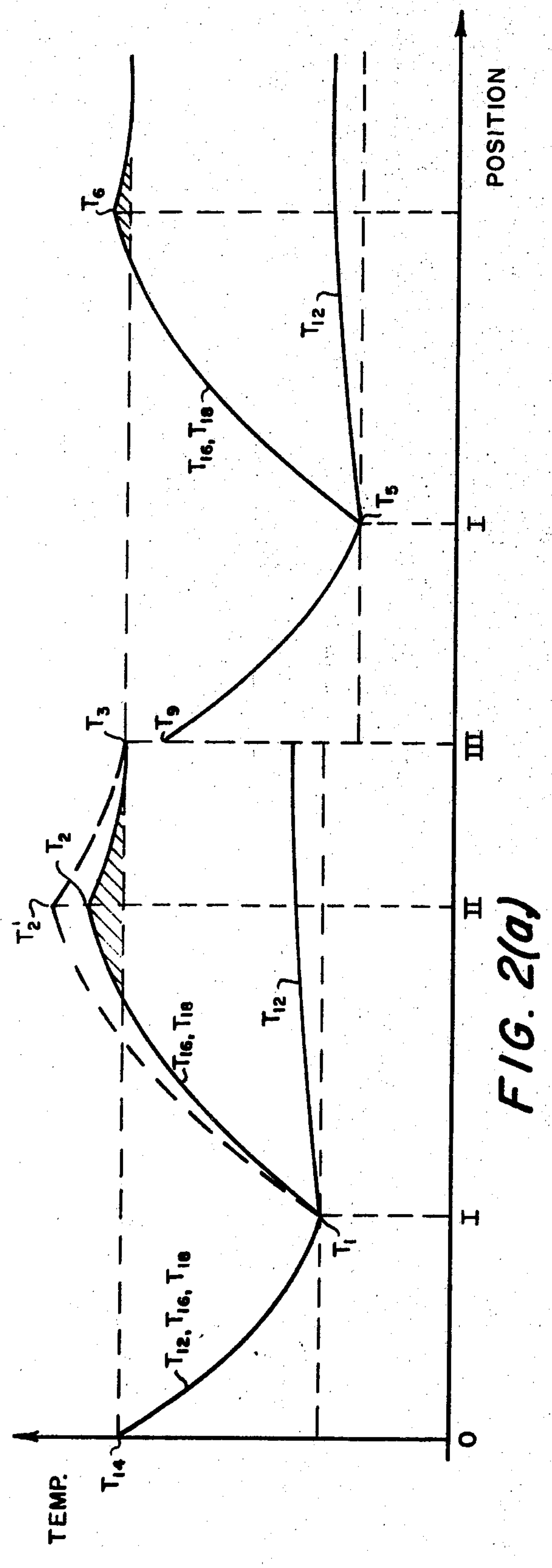
FIG. 2 shows the relative temperature variation of the refrigeration system with magnetic field position.
Figures 2B, 2C, 2D, 2E:
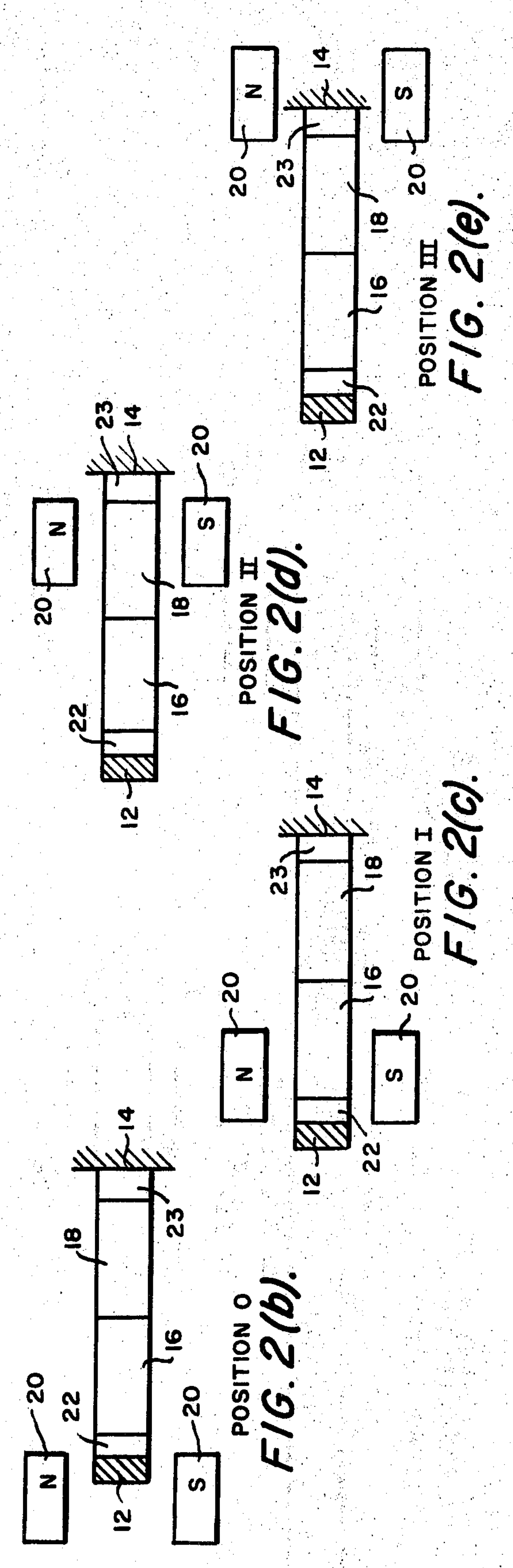

In FIG. 1, the source of magnetic field is permanent magnet 20 which is caused to move from left to right, the direction of heat flow. Magnet 20 may also be reciprocated back-and-forth, from left-to-right to left. As an illustrative example, and assuming operation within a cryogenic environment, with thermal switches 22, 23 of suitable super-conducting material and element 18 a thermal conductor nonresponsive to a magnetic field, the refrigeration system of FIG. 1 operates in the following manner. FIGS. 2 illustrate the variation of the system relative temperature T with position of magnetic field source 20. In the initial position, position O of FIG. 2(*b*), the magnetic field 20 is adjacent the heat source 12 with the relative temperature of the system at the reservoir temperature, $T_{14}$, FIG. 2(*a*). As the magnetic field moves to the right, passing over switch 22, the switch is "closed," completing the thermal flow path between heat source 12 and element 16. The magnetic field source 20 is so sized that the field is exerted upon switch 22 and conducting element 16 during movement of source 20. Note position I of FIG. 2(*c*). In the presence of this field, conducting element 16 cools, creating a temperature differential and permitting heat flow from source 12 across the "closed" thermal switch 22. The relative temperature of the system at position I is shown by $T_1$ in FIG. 2(*a*). After passage of magnetic field 20 to position II of FIG. 2(*d*), switch 22 "opens," preventing heat backflow to source 12. Conducting element 18, being in contact with element 16, is at the same temperature as element 16, which begins to heat after field 20 passes. The temperature $T_2$ reached by the conducting elements 16, 18 when the field is at position II will be somewhat higher than the reservoir temperature $T_{14}$ due to heat taken from the source and thermal losses. Switch 23 is then "closed," permitting heat to flow into reservoir 14. In position III, FIG. 2(*e*), the magnetic field 20 is adjacent the heat reservoir 14. The relative temperature of the system will now drop from $T_2$ to $T_3$ in FIG. 2(*a*). An amount of heat represented by the shaded area below $T_2$ has been transferred to the sink. In FIG. 2(*a*), $T_3$ is shown to be at the same level as $T_{14}$ for position zero. This completes one cycle.

As the magnetic field 20 passes to the right of reservoir 14 and begins to cycle through the positions of FIG. 2(*c*) – 2(*e*) for the second time, the relative temperature of the system will be at $T_4$, a mean value between $T_{12}$, the heat source, and $T_{16}$, $T_{18}$, the temperature of conducting elements 16, 18.

In the refrigeration system wherein conducting element 18 is of a paramagnetic material which cools upon removal of the magnetic field, the system temperature variation with field position is similar to that shown in FIGS. 2 with the exception that now the system temperature $T_2'$ of $T_{16}$ and $T_{18}$ is higher than $T_2$ due to the combined heating effect of elements 16 and 18 when field 20 is in position II, FIG. 2(*d*). $T_2'$ is shown by the broken line in FIG. 2(*a*). The optimum cycling in this case is through positions 0, I, II, III, II, I, 0, I, etc.

Figure 3:
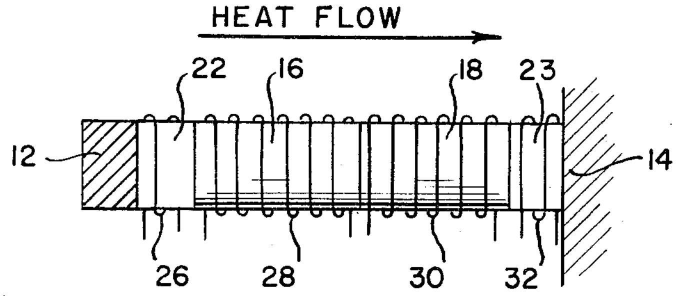
FIG. 3 is an alternative embodiment of the invention.

FIG. 3 represents an alternative embodiment of FIG. 1 wherein the movable permanent magnet is replaced with a plurality of solenoids 26–32 which may be sequentially energized by means well known in the art. This embodiment operates similarly to that of FIG. 1, but without any moving parts. Use of individual solenoids permits selective energization for more accurate control of the heat flow. In FIG. 3, the solenoids comprise separate coils which surrounded each thermal switch 22, 23 and each of the thermal conducting elements 16, 18.

In operation, the sequence of energization of solenoids 26–32 is represented by the table of FIG. 4 wherein the members in the first column represent the event sequence with "ON" and "OFF" indicating whether the solenoid is or is not energized. In the present example conducting element 18 is assumed to be of a paramagnetic material. If element 18 is a magnetically nonresponsive conductor, then of course, solenoid 30 may be omitted or solenoid 28 may surround both elements 16 and 18. The aforesaid differences in the refrigeration system relative temperatures, as set forth in the discussion of FIG. 2, when element 18 is a paramagnetic material is also applicable with regard to FIG. 3. Thus solenoids 26, 28 may be simultaneously energized to "close" switch 22 and to cool element 16, permitting heat to flow from source 12. Solenoids 30 and 32 are "OFF." Then solenoid 26 is de-energized, "opening" switch 22, with solenoid 28 still "ON," Simultaneously solenoid 28 is turned "OFF" and 30 is turned "ON," causing both elements 16, 18 to heat up. Subsequent energization of solenoid 32 "closes" switch 23, permitting flow of heat into reservoir 14. The process is repeated to achieve the proper degree of cooling. Sequential controls of coils 26–32 may be readily automated resulting in a reliable refrigeration system without any moving components.

Figure 5:
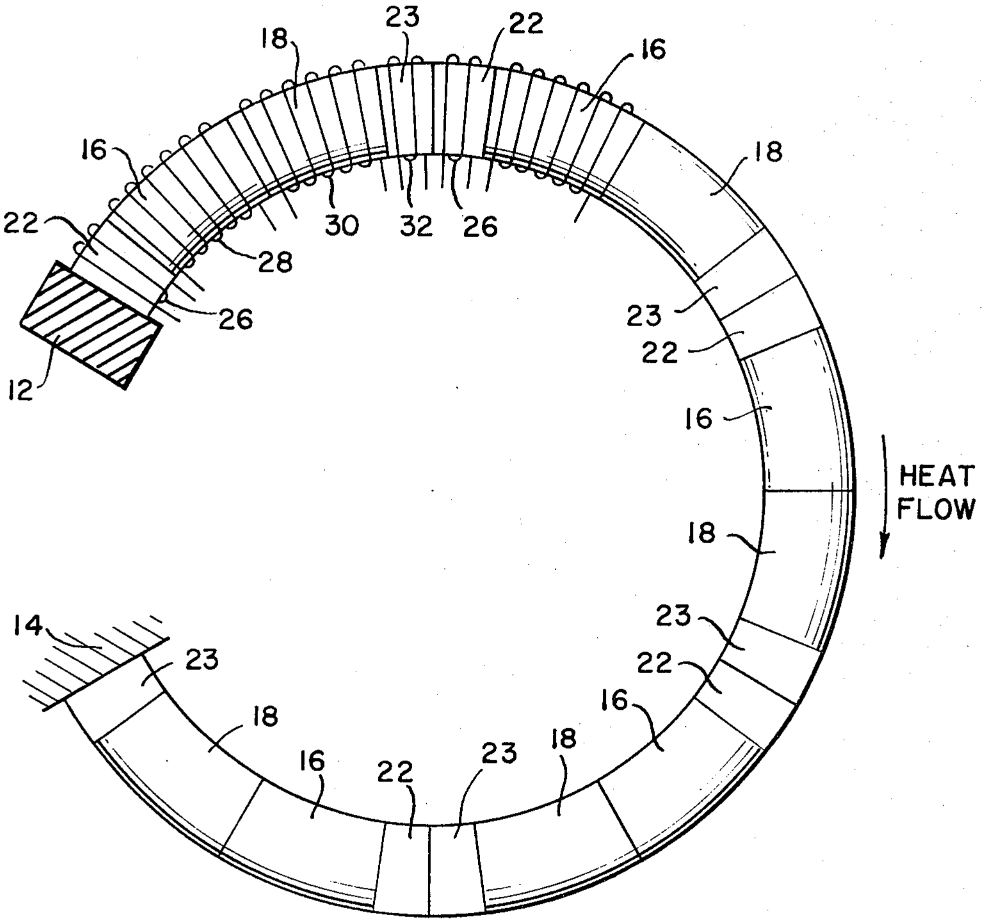
FIG. 5 is yet another embodiment of the invention.

The magnetocaloric elements 16, 18 may be cascaded to enhance and increase the heat transfer effect. FIG. 5 illustrates one possible configuration wherein a plurality of the elements 16 and 18 are alternately arranged into a split annulus, the terminals thereof free to be thermally connected to the heat source 12 and the heat sink 14. Adjacent to these elements are the thermal switches 22, 23 with the conducting elements 16, 18 in abutting position. Thus each stage of the cascaded refrigeration system includes the thermal switches 22, 23 and conducting elements 16 and 18. The thermal switch 23 of one stage of the refrigerator should be separated from switch 22 of the next stage, by magnetically isolating them, inserting a dummy or a magnetically nonresponsive thermal conductor between them, or some other suitable method. As shown in FIG. 5, a plurality of solenoids 26–32, sequentially energized in operation, as set forth relative to FIG. 3, encircle the cascaded cooling elements. For clarity, only a representative number of solenoids are shown. It is understood that with the cascaded arrangement element 16 of each successive stage will serve as the heat reservoir for the preceding stage.

While FIG. 5 shows the preferred use of solenoids a rotating permanent magnet or electromagnet could similarly be employed, rotated to move from heat source 12 in the direction of heat sink 14. Furthermore, the cooling elements may be arranged in a helical or spiral fashion with the free ends thereof connected to the heat source and heat sink. Of course multiple cascaded cooling stages may also be utilized in the configurations of FIGS. 1 and 3.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A magnetic refrigeration system comprising:
a first magnetocaloric thermal conductor;
a second thermal conductor serially connected to said first thermal conductor;
a source of magnetic field, said field movable along said first and said second thermal conductors to induce a thermal flow in said conductors; and
thermal switching means adapted to regulate the thermal flow through said conductors.

2. The magnetic refrigeration system of claim 1 wherein said first thermal conductor is of a material having a negative magnetocaloric effect which cools upon application of a magnetic field.

3. The refrigeration system of claim 2 wherein said thermal switching means is of a material completing a thermal flow path upon application of a magnetic field.

4. The refrigeration system of claim 3 wherein there are at least two thermal switches, one each thermally connected to the free ends of said first thermal conductor and said second thermal conductor.

5. The refrigeration system of claim 4 wherein said second thermal conductor is of a material nonresponsive to a magnetic field and in abutting relationship with said first thermal conductor.

6. The refrigeration system of claim 5 wherein said source of magnetic field is a permanent magnet movable between said thermal switches along said thermal conductors.

7. The refrigeration system of claim 6 wherein said first thermal conductor is of a ferrimagnetic, rear-earth, iron garnet and said thermal switches are of a superconducting material.

8. The refrigeration system of claim 7 further comprising a plurality of serial arrangements of said thermal switches and said thermal conductors arranged in refrigerating stages, each of said stages including a pair of said thermal switches, one of said first thermal conductor and one of said second thermal conductor.

9. The refrigeration system of claim 4 wherein said second thermal conductor is of a paramagnetic material which cools upon removal of a magnetic field.

10. The refrigeration system of claim 9 wherein said source of magnetic field is a permanent magnet movable between said thermal switches along said thermal conductors.

11. The refrigeration system of claim 10 wherein said first thermal conductor is of a ferrimagnetic, rare-earth, iron garnet and said thermal switches are of a superconducting material.

12. The refrigeration system of claim 11 further comprising a plurality of serial arrangements of said thermal switches and said thermal conductors arranged in refrigerating stages, each of said stages including a pair of said thermal switches, one of said first thermal conductor and one of said second thermal conductor.

13. The refrigeration system of claim 5 wherein said source of magnetic field is a plurality of solenoids adapted to be selectively energized permitting thermal flow between said switches along said thermal conductors.

14. The refrigeration system of claim 13 wherein a solenoid is provided for each of said thermal switches and said first thermal conductor.

15. The refrigeration system of claim 14 wherein said first thermal conductor is of a ferrimagnetic, rare-earth, iron garnet and said thermal switches are of a superconducting material.

16. The refrigeration system of claim 15 further comprising a plurality of serial arrangements of said thermal switches and said thermal conductors arranged in refrigerating stages, each of said stages including a pair of said thermal switches, one of said first thermal conductor and one of said second thermal conductor.

17. The refrigeration system of claim 9 wherein said source of magnetic field is an plurality of solenoids adapted to be selectively energized permitting thermal flow between said switches along said thermal conductors.

18. The refrigeration system of claim 17 wherein a solenoid is provided for each of said thermal switches and each of said thermal conductors.

19. The refrigeration system of claim 18 wherein said first thermal conductor is of a ferrimagnetic, rare-earth, iron garnet and said thermal switches are of a superconducting material.

20. The refrigeration system of claim 19 further comprising a plurality of serial arrangements of said thermal switches and said thermal conductors arranged in refrigerating stages, each of said stages including a pair of said thermal switches, one of said first thermal conductor and one of said second thermal conductor.

* * * * *